United States Patent
Sobaje

(10) Patent No.: US 8,462,789 B2
(45) Date of Patent: *Jun. 11, 2013

(54) NETWORK PROCESSORS AND METHODS ALLOWING FOR PREFETCHING INSTRUCTIONS BASED ON A PACKET TYPE OF A PACKET

(76) Inventor: Justin Mark Sobaje, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/467,066

(22) Filed: May 9, 2012

(65) Prior Publication Data

US 2012/0219002 A1 Aug. 30, 2012

Related U.S. Application Data

(63) Continuation of application No. 11/936,264, filed on Nov. 7, 2007, now Pat. No. 8,179,896.

(60) Provisional application No. 60/865,123, filed on Nov. 9, 2006, provisional application No. 60/951,231, filed on Jul. 22, 2007.

(51) Int. Cl.
*H04L 12/56* (2006.01)

(52) U.S. Cl.
USPC .............................. 370/392; 712/207; 726/13

(58) Field of Classification Search
None
See application file for complete search history.

(56) References Cited

U.S. PATENT DOCUMENTS

| | | | |
|---|---|---|---|
| 6,172,990 B1 | 1/2001 | Deb et al. | |
| 6,731,652 B2 | 5/2004 | Ramfelt et al. | |
| 6,778,534 B1 | 8/2004 | Tal et al. | |
| 6,854,117 B1 | 2/2005 | Roberts | |
| 6,934,951 B2 | 8/2005 | Wilkinson, III et al. | |
| 6,996,117 B2 | 2/2006 | Lee et al. | |
| 7,006,505 B1 | 2/2006 | Bleszynski et al. | |
| 7,010,673 B2 | 3/2006 | Svensson et al. | |
| 7,075,926 B2 * | 7/2006 | Cathey et al. | 370/389 |
| 7,080,238 B2 | 7/2006 | Van Hoof et al. | |
| 2003/0041163 A1 | 2/2003 | Rhoades et al. | |
| 2004/0083354 A1 * | 4/2004 | Kunze et al. | 712/248 |
| 2004/0120319 A1 | 6/2004 | Asawa et al. | |
| 2005/0044252 A1 | 2/2005 | Floyd et al. | |
| 2005/0163107 A1 | 7/2005 | Gunturi et al. | |
| 2006/0198385 A1 | 9/2006 | Szumilas | |
| 2006/0288346 A1 | 12/2006 | Santos et al. | |
| 2007/0174555 A1 | 7/2007 | Burtscher et al. | |
| 2009/0089546 A1 | 4/2009 | Lakshmanamurthy et al. | |

OTHER PUBLICATIONS

U.S. Appl. No. 60/206,617, filed May 24, 2000, Clear.

(Continued)

*Primary Examiner* — Brian Roberts

(57) ABSTRACT

A network processor of an embodiment includes a packet classification engine, a processing pipeline, and a controller. The packet classification engine allows for classifying each of a plurality of packets according to packet type. The processing pipeline has a plurality of stages for processing each of the plurality of packets in a pipelined manner, where each stage includes one or more processors. The controller allows for providing the plurality of packets to the processing pipeline in an order that is based at least partially on: (i) packet types of the plurality of packets as classified by the packet classification engine and (ii) estimates of processing times for processing packets of the packet types at each stage of the plurality of stages of the processing pipeline. A method in a network processor allows for prefetching instructions into a cache for processing a packet based on a packet type of the packet.

15 Claims, 11 Drawing Sheets

OTHER PUBLICATIONS

U.S. Appl. No. 60/206,996, filed May 24, 2000, Cathey.
U.S. Appl. No. 60/220,335, filed Jul. 24, 2000, Cathey et al.
U.S. Appl. No. 60/246,447, filed Nov. 7, 2000, Tallegas et al.
U.S. Appl. No. 60/278,310, filed Mar. 23, 2001, Van Hoof et al.
Becchi, M., and Crowley, P., "Dynamic Thread Assignment on Heterogeneous Multiprocessor Architectures", Proc. of the 3rd Conference on Computing Frontiers, May 2006, pp. 29-39. As Downloaded from Internet.
Comer, D.E., "Network Systems Design Using Network Processors", Prentice Hall, Jan. 2003, pp. 109-110, 115-131, 186-188, and 223-224.
Crowley, P., Fiuczynski, M.E., Baer, J., and Bershad, B, "Workloads for Programmable Network Interfaces", In Workload Characterization for Computer System Design, Chapter 7, Kluwer Academic Publishers, 2000. As Downloaded from Internet.
EZchip Technologies, "EZchip Technologies: Company Profile", EZchip Technologies Ltd., 2005.
EZchip Technologies, "The Role of Memory in NPU System Design", EZchip Technologies Ltd., White Paper, 2003.
EZchip Technologies, "NP-1C: Product Brief", EZchip Technologies Ltd., 2003.
EZchip Technologies, "Network Processor Designs for Next-Generation Networking Equipment", EZchip Technologies Ltd., White Paper, 1999.
Franklin, M.A., and Datar, S., "Pipeline Task Scheduling on Network Processors", Network Processor Design—Issues and Practices, vol. 3, Chapter 11, Elsevier, Inc., 2005, pp. 219-244.
Franklin, M.A., Tyson, E.J., Buckley, J., Crowley, P., and Maschmeyer, J., "Auto-Pipe and the X Language: A Pipeline Design Tool and Description Language", in Proc. of Int'l Parallel and Distributed Processing Symp., Apr. 2006. As Downloaded from Internet.
Guo, J., Yao, J., and Bhuyan, L., "An Efficient Packet Scheduling Algorithm in Network Processors", INFOCOM 2005, Miami, FL, Mar. 2005, pp. 807-818. As Downloaded from Internet.
Huang, X., and Wolf, T., "A Methodology for Evaluating Runtime Support in Network Processors", in Proc. of ACM/IEEE Symposium on Architectures for Networking and Communication Systems (ANCS), San Jose, CA, Dec. 2006, pp. 113-122. As Downloaded from Internet.
Intel Corporation, "Network Processors", Intel Technology Journal, vol. 6, Issue 3, Aug. 15, 2002.
Kumar, S., and Crowley, P., "A Scalable, Cache-Based Queue Management Subsystem for Network Processors", ASPLOS-XI Building Block Engine Architectures for Computers and Networks, 2004, Oct. 10, 2004. As Downloaded from Internet.
Kumar, S., Maschmeyer, J., and Crowley, P., "Exploiting Locality to Ameliorate Packet Queue Contention and Serialization", In Proceedings of the 3rd ACM Int'l Conference on Computing Frontiers, Ischia, Italy. May 2006. As Downloaded from Internet.
Ramaswamy, R., Weng, N., and Wolf, T., "Analysis of Network Processing Workloads", in Proc. of IEEE International Symposium on Performance Analysis of Systems and Software (ISPASS), Austin, TX, Mar. 2005, pp. 226-235. As Downloaded from Internet.
Schwaderer, C., "A Look at Network Processor Development Environments and Programming", Reprint from CompactPCI and AdvancedTCA Systems, Oct. 2005.
Shah, N., "Understanding Network Processors", Ver. 1.0, University of California, Berkeley, Sep. 2001.
Sherwood, T., Varghese, G., and Calder, B., "A Pipelined Memory Architecture for High Throughput Network Processors", In the Proc. of the 30th Annual Intl. Symposium on Computer Architecture (ISCA 2003), San Diego, CA, Jun. 2003. As Downloaded from Internet.
Wolf, T. and Franklin, M.A., "Locality-Aware Predictive Scheduling of Network Processors", In Proc. of IEEE International Symposium on Performance Analysis of Systems and Software (ISPASS), Tucson, AZ, Nov. 2001, pp. 152-159. As Downloaded from Internet.
Wolf, T., Pappu, P., and Franklin, M.A., "Predictive Scheduling of Network Processors", Computer Networks, vol. 41, No. 5, pp. 601-621, Apr. 2003. As Downloaded from Internet.
Wolf, T., "Design and Performance of Scalable High-Performance Programmable Routers", Dissertation, Washington University Sever Institute of Technology, Department of Computer Science, Saint Louis, Missouri, Aug. 2002.
Xelerated, "Programming a Data Flow Processor", Xelerated, Inc., White Paper, Sep. 2003.
Yao et al., "Optimal Network Processor Topologies for Efficient Packet Processing," IEEE, 2005.
Office Action for U.S. Appl. No. 11/936,264, dated Feb. 13, 2012.
Office Action for U.S. Appl. No. 11/936,264, dated May 4, 2011.
Office Action for U.S. Appl. No. 11/936,264, dated Feb. 19, 2010.
Office Action for U.S. Appl. No. 11/936,264, dated Aug. 10, 2009.

* cited by examiner

NETWORK PROCESSORS AND METHODS ALLOWING FOR PREFETCHING INSTRUCTIONS BASED ON A PACKET TYPE OF A PACKET

CROSS-REFERENCE TO RELATED PATENT APPLICATIONS

This application is a continuation of U.S. patent application Ser. No. 11/936,264, filed Nov. 7, 2007. U.S. patent application Ser. No. 11/936,264 claims the benefit of U.S. Provisional Pat. App. Ser. No. 60/865,123, filed Nov. 9, 2006. U.S. patent application Ser. No. 11/936,264 also claims the benefit of U.S. Provisional Pat. App. Ser. No. 60/951,231, filed Jul. 22, 2007. The entire contents of all of the above-referenced patent applications are incorporated by reference herein.

BACKGROUND OF THE INVENTION

1. Field of the Invention

Embodiments of the present invention relate generally to network processors, switches, routers, networks, and pipeline optimization methods and, in specific embodiments, to a network processor with a processing pipeline.

2. Related Art

With the increasing use of the Internet for data intensive applications, there has been a growing demand for greater communication speeds. While communication links, such as fiber optic cables, are able to support high communication rates, overall communication speed has been limited by the speed of processors used to process data transmitted over the communication links. Recently, there has been a recognition that general purpose processors cannot process packets fast enough to keep up with the demand for greater network speeds. Thus, a new type of specialized processor, known as a "network processor", has emerged to perform packet processing operations with improved performance.

A related art network processor is disclosed in U.S. Pat. No. 6,778,534 entitled "High-Performance Network Processor", the contents of which are incorporated by reference herein, and which is hereinafter referred to as reference 1. FIG. 1 illustrates a design of a network processor 120 as disclosed in reference 1. A key feature of the network processor 120 is the use of task optimized processors (TOPs) 122, 123, 124, and 125, which are employed in a pipelined architecture, to perform the packet processing tasks of parse, search, resolve, and modify. Each TOP 122, 123, 124, 125 may be configured with a customized instruction set and a customized data path for performing specific tasks, so as to reduce a number of clock cycles required to complete the tasks as compared with general purpose processors. The pipelined architecture serves as a sort of computing assembly line in which processing of different packets at different stages of the pipeline can occur at a same time.

As described in reference 1, and with reference to FIG. 1, information packets from a network 110 are transferred to a parsing stage TOP 122 of the network processor 120 via a link controller 121. The parsing stage TOP 122 allows for extracting and analyzing the contents of packet headers and fields. From the parsing stage TOP 122, packets are passed to a searching stage TOP 123, which also receives search keys extracted by the parsing stage TOP 122. The searching stage TOP 123 performs various table look-ups required for switching, routing, session switching, content switching, and policy enforcement. Search results from the searching stage TOP 123 are then passed along with the packet to a resolution stage TOP 124, which assigns the packet to an appropriate output port, and attends to any quality of service requirements. From the resolution stage TOP 124, the packet is passed to a modification stage TOP 125, where the modification stage TOP 125 allows for modifying certain fields within the packet. The packet is then queued in a queue 126, and then output to a switch matrix 130. Each of the TOPs 122, 123, 124, 125 is able to access random access memory (RAM) 127.

A comparison is provided in reference 1 of clock cycles required to perform packet processing tasks using TOPs versus clock cycles required to perform the same tasks by a general purpose processor. For example, while a typical general purpose processor may take 400 clock cycles to parse a typical HTTP packet and determine a URL, a parser implemented as a TOP may take only 60 clock cycles. Also, while a general purpose processor may take 80 clock cycles to resolve a multicast routing decision, a TOP may take 8 or less clock cycles. Thus, substantial performance improvements are realized through the use of task optimized processors.

Another related art network processor is disclosed in U.S. Pat. No. 7,075,926 entitled "Programmable Packet Processor with Flow Resolution Logic", the contents of which are incorporated by reference herein, and which is hereinafter referred to as reference 2. FIG. 2 illustrates a network processor 200 as disclosed in reference 2. A key feature of the network processor 200 is a packet classification engine 220 that classifies each input packet by packet type using one or both of header data and payload data, and then identifies application programs to be executed by sub-engines 231, 232, 233, and 234 based on the determined packet type. The sub-engines 231, 232, 233, 234 are packet processing engines that are arrayed in a pipelined architecture and, thus, are configured to process inbound packets in stages.

As described in reference 2, and with reference to FIG. 2, an input packet is stored in packet buffer 210, and the packet classification engine 220 identifies programs to be executed by each sub-engine 231, 232, 233, 234 in an application engine 230 based on a determined packet type of the input packet. The packet classification engine 220 then provides start indicators to indicate start addresses of the programs to be executed by the sub-engines 231, 232, 233, 234. A first sub-engine 231 in the pipeline starts executing an associated program at an associated start address specified by the packet classification engine 220 and, once the execution of the associated program has completed, the first sub-engine 231 starts the next sub-engine 232 in the pipeline. The process continues until the last sub-engine 234 in the pipeline has executed its associated program, where the associated program starts at an associated start address provided by the packet classification engine 220. Thus, in the network processor 200, programs to be executed by pipelined sub-engines 231, 232, 233, 234 for processing a packet are determined based on a classified type of the packet.

Examples of further related art systems and methods are disclosed in the following references: (i) U.S. Provisional App. Ser. No. 60/206,617, entitled "System and Method for Enhanced Line Cards"; (ii) U.S. Provisional App. Ser. No. 60/206,996, entitled "Flow Resolution Logic System and Method"; (iii) U.S. Provisional App. Ser. No. 60/220,335, entitled "Programmable Network Processor"; (iv) U.S. Provisional App. Ser. No. 60/246,447, entitled "High Speed Network Processor"; (v) U.S. Provisional App. Ser. No. 60/278,310, entitled "Non-Blocking Multi-Context Pipelined Processor"; (vi) U.S. Pat. No. 7,080,238, entitled "Non-Blocking Multi-Context Pipelined Processor"; (vii) U.S. Pat. No. 6,996,117, entitled "Vertical Instruction and Data Processing in a Network Processor Architecture"; and (viii) U.S.

Pat. No. 7,010,673, entitled "Apparatus and Method for Processing Pipelined Data"; the contents of each of which are incorporated by reference herein.

SUMMARY OF THE DISCLOSURE

Embodiments of the present invention relate generally to network processors, switches, routers, networks, and pipeline optimization methods and, in specific embodiments, to a network processor with a processing pipeline.

A network processor in accordance with an embodiment of the present invention includes a packet classification engine, a processing pipeline, and a controller. The packet classification engine allows for classifying each of a plurality of packets according to packet type. The processing pipeline has a plurality of stages for processing each of the plurality of packets in a pipelined manner, where each stage of the plurality of stages includes one or more processors. The controller allows for providing the plurality of packets to the processing pipeline in an order that is based at least partially on: (i) packet types of the plurality of packets as classified by the packet classification engine; and (ii) estimates of processing times for processing packets of the packet types at each stage of the plurality of stages of the processing pipeline.

In various embodiments, a processor of the one or more processors of a first stage of the plurality of stages is a different type of processor than a processor of the one or more processors of a second stage of the plurality of stages. In some embodiments, the network processor further includes a plurality of queues, where each queue of the plurality of queues allows for storing packets of a corresponding packet type, and where the plurality of queues are configured to store the plurality of packets. In further embodiments, the controller is configured to access the plurality of queues in accordance with the order to provide the plurality of packets to the processing pipeline.

In various embodiments, each packet of the plurality of packets includes a packet header and payload data. In some embodiments, the network processor is located in at least one of a router and a switch and is employed in a computer network. Also, in some embodiments, the packet classification engine is configured to receive the plurality of packets from an Ethernet connection. A router in accordance with various embodiments of the present invention includes the network processor. Also, a switch in accordance with various embodiments of the present invention includes the network processor.

A method in a network processor in accordance with an embodiment of the present invention includes: (a) classifying each packet of a plurality of packets into a corresponding packet type of a plurality of packet types; (b) determining an order of processing the plurality of packets in a processing pipeline based at least partially on (i) the corresponding packet type of each packet of the plurality of packets and (ii) estimates of processing times for processing packets of the plurality of packet types at each stage of a plurality of stages of the processing pipeline; and (c) providing the plurality of packets to the processing pipeline in the determined order.

In various embodiments, the classifying includes classifying each packet of the plurality of packets into the corresponding packet type of the plurality of packet types based on at least one of header data of the packet and payload data of the packet. In some embodiments, the method further includes processing a packet of a packet type by a processor of a stage of the plurality of stages; prefetching, into a particular cache, instructions for processing packets of the packet type while the processor is processing the packet; and obtaining the instructions from the particular cache to process the packet by a particular processor of a particular stage of the plurality of stages, where the particular stage is located after the stage in the processing pipeline. Also, in some embodiments the method further includes obtaining the estimates of processing times for processing packets of the plurality of packet types at each stage of the plurality of stages through experiments in which packets of the plurality of packet types are processed by the processing pipeline.

A method in accordance with an embodiment of the present invention is performed in a network processor. The network processor includes a processing pipeline having a plurality of stages. The method includes: (a) receiving a plurality of packets into the network processor in a first order; (b) classifying each packet of the plurality of packets into a corresponding packet type of a plurality of packet types; (c) determining a second order in which to provide the plurality of packets to the processing pipeline based at least partially on the corresponding packet type of each packet of the plurality of packets; and (d) providing the plurality of packets to the processing pipeline in the second order.

In various embodiments, the determining includes determining the second order in which to provide the plurality of packets to the processing pipeline based at least partially on (i) the corresponding packet type of each packet of the plurality of packets and (ii) estimates of processing times for processing packets of the plurality of packet types at each stage of the plurality of stages of the processing pipeline. In some embodiments, the method further includes processing a packet of a packet type by a processor of a stage of the plurality of stages; prefetching, into a particular cache, instructions for processing packets of the packet type while the processor is processing the packet; and obtaining the instructions from the particular cache to process the packet by a particular processor of a particular stage of the plurality of stages, where the particular stage is located after the stage in the processing pipeline. In various embodiments, the receiving includes receiving the plurality of packets from one or more Ethernet network links.

A method in accordance with an embodiment of the present invention is performed in a network processor. The network processor includes a processing pipeline having a plurality of stages. The method includes: (a) processing a packet of a packet type by a processor of a stage of the plurality of stages; (b) prefetching, into a particular cache, instructions for processing packets of the packet type while the processor is processing the packet; and (c) obtaining the instructions from the particular cache to process the packet by a particular processor of a particular stage of the plurality of stages, where the particular stage is located after the stage in the processing pipeline.

In various embodiments, the processing includes performing table look-ups required for at least one of switching, routing, session switching, content switching, and policy enforcement related to the packet. Also, in various embodiments, the processing includes assigning the packet to an output port of a plurality of output ports. In some embodiments, the prefetching occurs while the particular processor is idle.

A method in one or more computers in accordance with an embodiment of the present invention includes: (a) obtaining information for each packet type of a plurality of packet types and for each processor design of a plurality of processor designs for each stage of a plurality of stages of a processing pipeline, where the information includes a corresponding estimate of processing time for processing a packet of the packet type by a processor of the processor design; (b) specifying a linear program based on the information, where the linear program includes a corresponding binary variable for each processor design of the plurality of processor designs for each stage of the plurality of stages of the processing pipeline; (c) solving the linear program to assign a corresponding value to the corresponding binary variable for each processor design of the plurality of processor designs for each stage of the plurality of stages of the processing pipeline; and (d) outputting design information relating to processor designs of the plurality of processor designs to be used for a network processor based on the corresponding value of the corresponding binary variable for each processor design of the plurality of processor designs for each stage of the plurality of stages of the processing pipeline. In various embodiments, the method further includes constructing a network processor in accordance with the design information.

Thus, embodiments of the present invention relate to network processors, switches, routers, networks, and pipeline optimization methods.

DETAILED DESCRIPTION OF PREFERRED EMBODIMENTS

Figure 1:
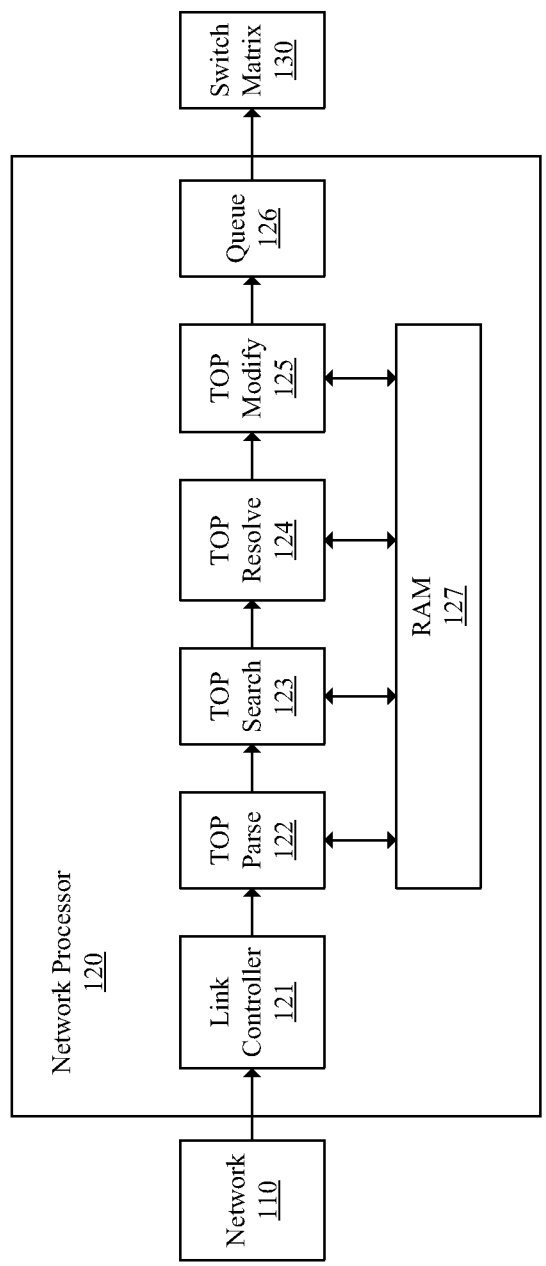
FIG. 1 illustrates a prior art network processor in communication with a network and a switch matrix.
Figure 2:
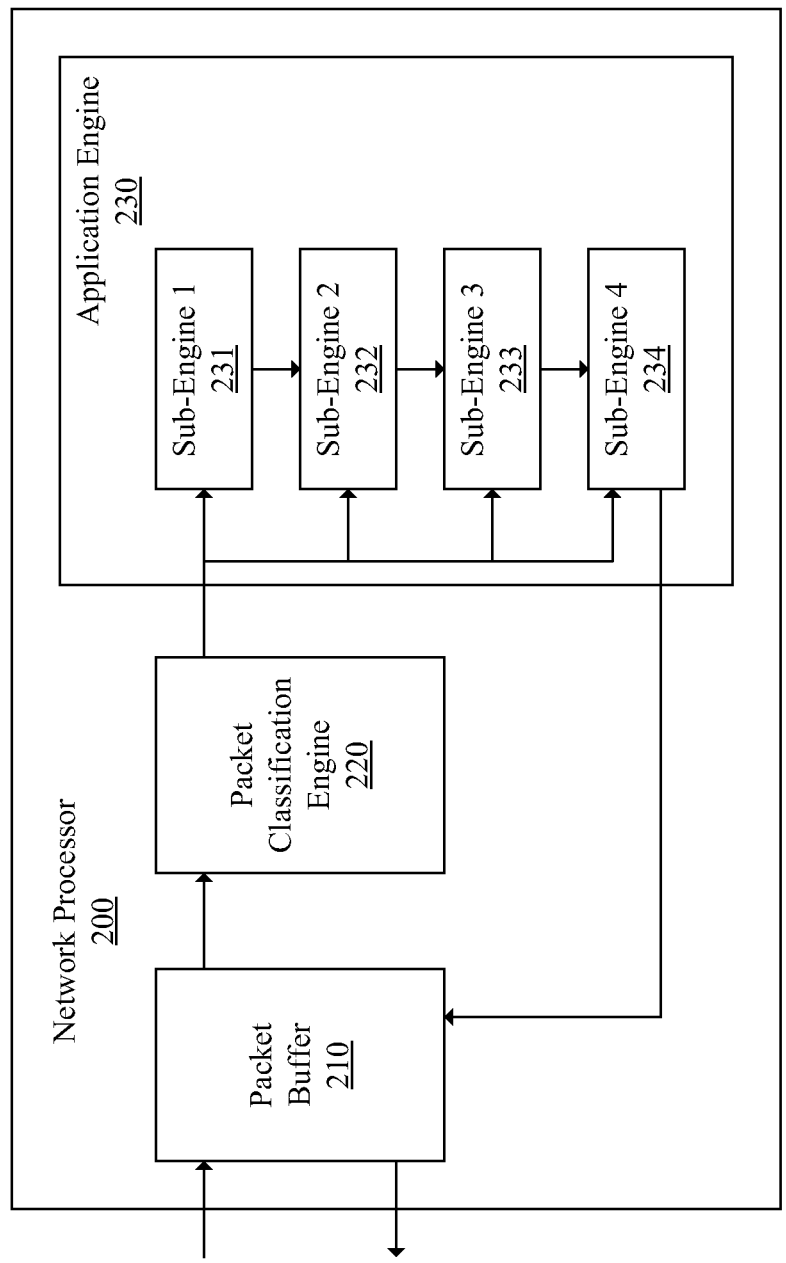
FIG. 2 illustrates another prior art network processor.
Figure 3:
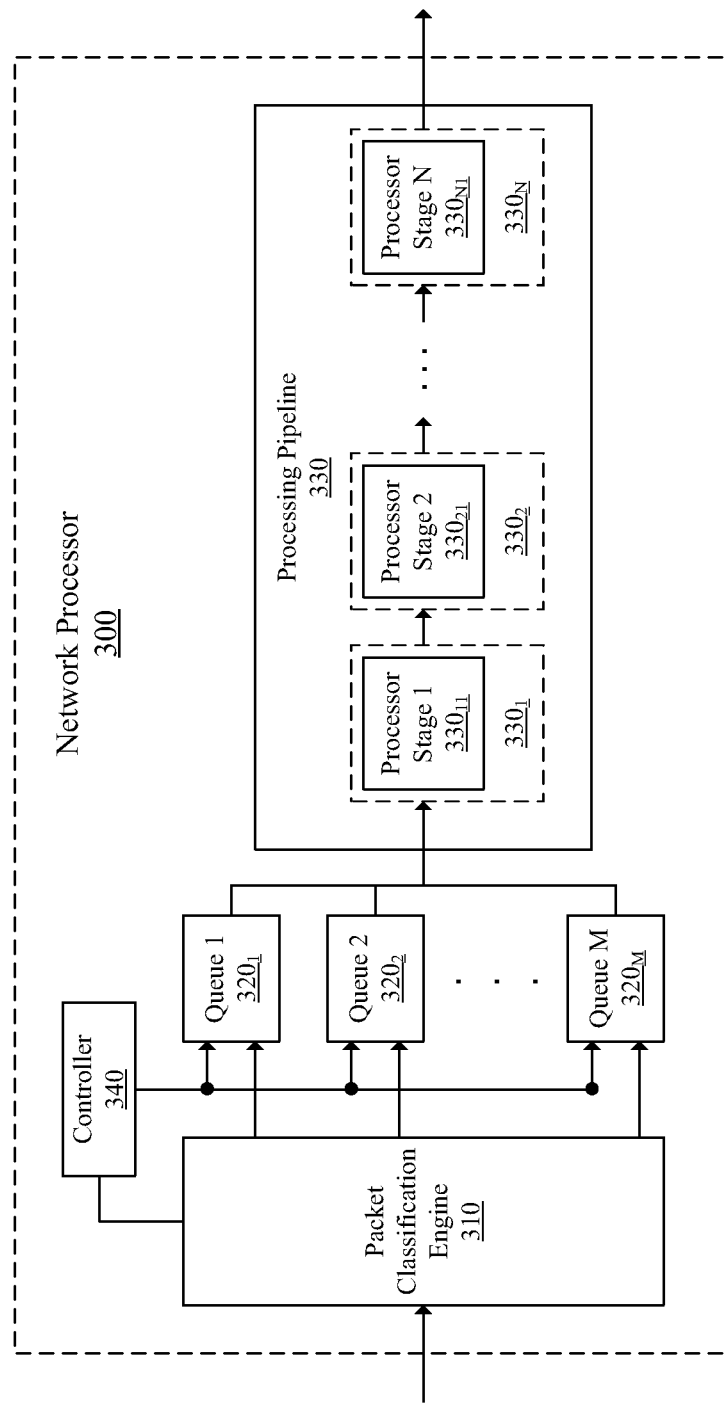
FIG. 3 illustrates a network processor in accordance with an embodiment of the present invention.

FIG. 3 illustrates a network processor 300 in accordance with an embodiment of the present invention including a packet classification engine 310, a plurality of queues $320_1$, $320_2$, ..., $320_M$, a processing pipeline 330, and a controller 340. The packet classification engine 310 is configured to receive packets and to classify the received packets according to packet type. Each queue of the plurality of queues $320_1$, $320_2$, ..., $320_M$, is configured to store packets of a corresponding packet type. The packet classification engine 310 is configured to output packets to the appropriate queues $320_1$, $320_2$, ..., $320_M$, based on the classified packet types. The processing pipeline 330 includes a plurality of stages $330_1$, $330_2$, ..., $330_N$, each having a corresponding processor $330_{11}, 330_{21}, ..., 330_{N1}$, organized in a pipelined architecture for performing packet processing. The controller 340 is configured to control an order in which packets are selected from the plurality of queues $320_1$, $320_2$, ..., $320_M$, to be provided to the processing pipeline 330.

The packet classification engine 310 is configured to classify input packets according to packet type. For each packet, the packet classification engine 310 may use at least one of header data of the packet and payload data of the packet to classify the packet into a corresponding packet type of a plurality of packet types. In some embodiments, the packet classification engine 310 includes packet classification logic (not shown) configured as a decision tree for classifying packets, similar to the packet classification logic disclosed in U.S. Pat. No. 7,075,926. In various embodiments, the packet classification engine 310 is configured such that, once the packet classification engine 310 has classified a packet, the packet classification engine 310 stores either the packet or an identifier associated with the packet into a corresponding queue of the plurality of queues $320_1$, $320_2$, ..., $320_M$, based on the classified packet type of the packet.

The plurality of processors $330_{11}, 330_{21}, ..., 330_{N1}$, in the processing pipeline 330 may be task optimized processors that are configured with customized instruction sets and customized data paths for performing specific tasks. The plurality of queues $320_1$, $320_2$, ..., $320_M$, may be implemented with separate memory modules, or may be implemented with a single memory module that is divided into the plurality of queues $320_1$, $320_2$, ..., $320_M$. Also, rather than storing packets in the plurality of queues $320_1$, $320_2$, ..., $320_M$, packets may be stored in a packet buffer (not shown), and the plurality of queues $320_1$, $320_2$, ..., $320_M$, may store tokens with pointers to corresponding packets in the packet buffer.

The controller 340 may be programmed to access the plurality of queues $320_1$, $320_2$, ..., $320_M$, in a desired order. For example, the controller 340 may be programmed to access the plurality of queues $320_1$, $320_2$, ..., $320_M$, in an order that optimizes a throughput of the processing pipeline 330, while ensuring that each queue of the plurality of queues $320_1$, $320_2$, ..., $320_M$, is accessed within a prescribed time period. In some instances, an order of accessing the plurality of queues $320_1$, $320_2$, ..., $320_M$, may be preset within the controller 340. In other instances, the controller 340 may be provided with information concerning a time required for processing packets of each packet type of a plurality of packet types at each stage in the processing pipeline 330, and the controller 340 may be programmed to access the plurality of queues $320_1$, $320_2$, ..., $320_M$, based on the information and based on which queues of the plurality of queues $320_1$, $320_2$, ..., $320_M$, are currently storing packets.

The processing pipeline allows for processing different packets at different stages of the plurality of stages $330_1$, $330_2$, ..., $330_N$, at a same time. In various embodiments, the network processor 300 is configured to receive a plurality of packets, and the controller 340 is configured to provide the plurality of packets to the processing pipeline 330 in an order that is based at least partially on: (i) packet types of the plurality of packets as classified by the packet classification engine 310, and (ii) estimates of processing times for processing packets of the packet types at each stage of the plurality of stages $330_1$, $330_2$, ..., $330_N$, of the processing pipeline 330.

For example, consider a case in which the network processor 300 includes three queues for the plurality of queues $320_1$, $320_2$, ..., $320_M$, for storing three packet types, and the processing pipeline 330 includes three stages for the plurality of stages $330_1$, $330_2$, ..., $330_N$. In the example, assume that experimentation shows that: (i) packets of a type A require 10 clock cycles in stage 1, 5 clock cycles in stage 2, and 7 clock cycles in stage 3; (ii) packets of a type B require 7 clock cycles in stage 1, 10 clock cycles in stage 2, and 5 clock cycles in stage 3; and (iii) packets of a type C require 5 clock cycles in stage 1, 7 clock cycles in stage 2, and 10 clock cycles in stage 3. In such an example, the controller 340 may be configured to access the plurality of queues $320_1$, $320_2$, ..., $320_M$, such that packets are provided to the processing pipeline 330 in a repeating order of: a packet of type C, a packet of type B, and a packet of type A, so as to optimize a throughput of the pipeline in accordance with the processing times for processing packets of each packet type at each stage in the processing pipeline 330. In the example, the packet classification engine 310 would be configured to classify each incoming packet received into the network processor 300 into one of type A, type B, and type C, based on at least one of header data and payload data of the packet.

In the example, when a packet of type C is in a third stage of the processing pipeline 330, and a packet of type B is in a second stage of the processing pipeline 330, and a packet of type A is in a first stage of the processing pipeline 330, each packet is processed at the corresponding stage in 10 clock cycles. Also, in the example, when a packet of type B is in a third stage of the processing pipeline 330, and a packet of type A is in a second stage of the processing pipeline 330, and a packet of type C is in a first stage of the processing pipeline 330, each packet is processed at the corresponding stage in 5 clock cycles. Moreover, in the example, when a packet of type A is in a third stage of the processing pipeline 330, and a packet of type C is in a second stage of the processing pipeline 330, and a packet of type B is in a first stage of the processing pipeline 330, each packet is processed at the corresponding stage in 7 clock cycles.

Thus, by ordering the packets to be provided to the processing pipeline 330 based on packet type and based on estimates of processing times for processing packets of each of the packet types at each stage in the processing pipeline 330, a throughput of the processing pipeline 330 may be optimized as compared with providing the packets to the processing pipeline 330 in an order that they are received by the network processor 300. In various embodiments, the controller 340 includes a table (not shown) storing estimates of processing times for processing packets of each of a plurality of packet types at each stage of the plurality of stages $330_1$, $330_2$, ..., $330_N$, of the processing pipeline 330, and the controller 340 is configured to determine an order in which to provide packets to the processing pipeline 330 based on the estimates of processing times stored in the table, so as to optimize a throughput of the processing pipeline 330. In some embodiments, the estimates of processing times are obtained through experiments in which packets of the plurality of packet types are processed by the processing pipeline 330 and the processing times are recorded.

In various embodiments, the controller 340 may be programmed to access the queues $320_1$, $320_2$, ..., $320_M$, in a preset order and to select a predetermined number of packets from each queue $320_1$, $320_2$, ..., $320_M$, if available, before selecting packets from a next queue in the order. In such an instance, each time a queue of the plurality of queues $320_1$, $320_2$, ..., $320_M$, is accessed by the controller 340, a first packet from the queue may be provided to the processing pipeline along with start indicators to indicate start addresses of programs to be executed by the processors $330_{11}$, $330_{21}$, ..., $330_{N1}$, for packets from that queue. In various embodiments, the start indicators may then be saved at the plurality of stages $330_1$, $330_2$, ..., $330_N$, and used for subsequent packets from that queue, which may reduce an amount of control information that is required to be provided in the network processor 300.

Figure 4:
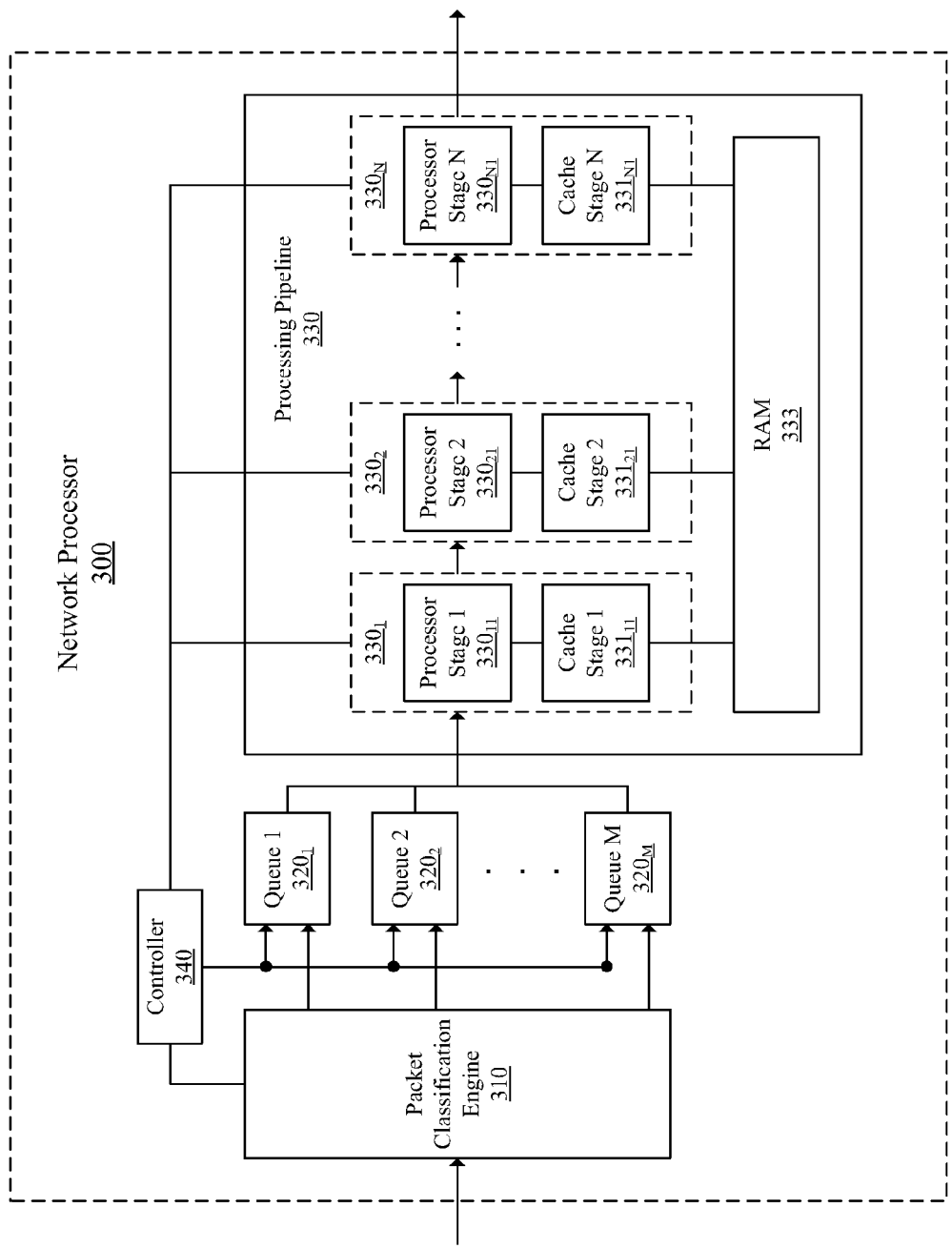
FIG. 4 illustrates a network processor in accordance with an embodiment of the present invention.

FIG. 4 illustrates the network processor 300 in accordance with another embodiment of the present invention. The network processor 300 of FIG. 4 is similar to the network processor 300 of FIG. 3, but further includes a RAM 333, and also further includes a corresponding cache $331_{11}$, $331_{21}$, ..., $331_{N1}$, in each stage of the plurality of stages $330_1$, $330_2$, ..., $330_N$, of the processing pipeline 330. In various embodiments, the controller 340 is connected to each stage of the plurality of stages $330_1$, $330_2$, ..., $330_N$, of the processing pipeline 330 for providing control information.

In various embodiments, the controller 340 is configured such that, when a processor in a stage of the plurality of stages $330_1$, $330_2$, ..., $330_N$, of the processing pipeline 330 is processing a packet of a packet type, the controller 340 causes a cache in a following particular stage to prefetch instructions from the RAM 333 that will be used to process the packet by a processor in the particular stage. For example, when the processor $330_{11}$ of the first stage $330_1$ of the processing pipeline 330 is processing a packet of a packet type, the controller 340 may cause the cache $331_{21}$ of the second stage $330_2$ of the processing pipeline 330 to prefetch instructions from the RAM 333 that are used by the processor $330_{21}$ of the second stage $330_2$ of the processing pipeline to process packets of the packet type. By prefetching the instructions into the cache $331_{21}$ of the second stage $330_2$ while the packet is being processed by the processor $330_{11}$ of the first stage $330_1$, the instructions are available to the processor $330_{21}$ of the second stage $330_2$ to begin processing the packet when the packet is output from the first stage $330_1$ to the second stage $330_2$. Thus, such prefetching of instructions into caches based on packet type may allow for improved pipeline performance.

Figure 5:
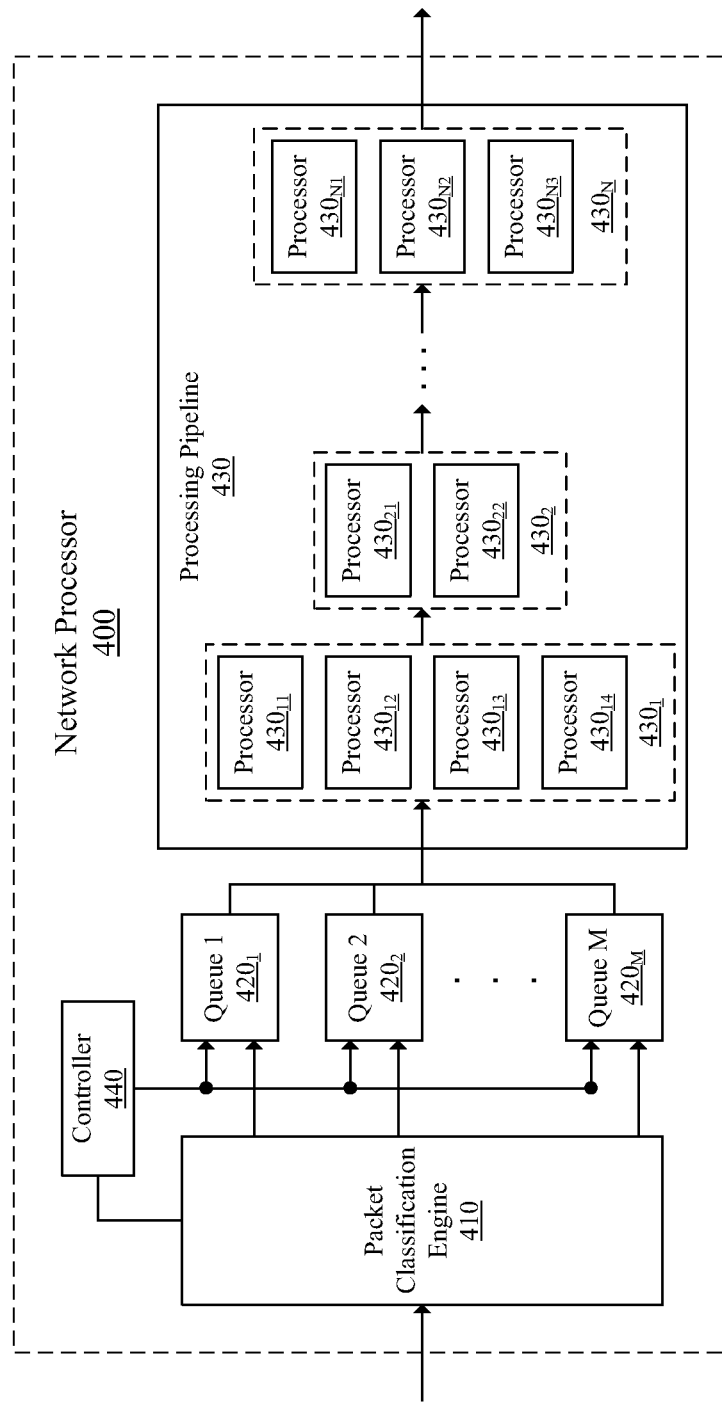
FIG. 5 illustrates a network processor in accordance with an embodiment of the present invention.

FIG. 5 illustrates a network processor 400 in accordance with an embodiment of the present invention that is similar to the network processor 300 of FIG. 3, but the network processor 400 of FIG. 5 includes a superscalar processing pipeline 430. In the processing pipeline 430, each stage of the plurality of stages $430_1$, $430_2$, ..., $430_N$, in the processing pipeline 430 may have more than one processor for performing packet processing at that stage in the pipeline. For example, in the illustrated embodiment, the first stage $430_1$ has four processors $430_{11}$, $430_{12}$, $430_{13}$, $430_{14}$, the second stage $430_2$ has two processors $430_{21}$, $430_{22}$, and the Nth stage $430_N$ has three processors $430_{N1}$, $430_{N2}$, $430_{N3}$. A controller 440 may then control a plurality of queues $420_1$, $420_2$, ..., $420_M$, such that one or more packets are provided to the processing pipeline 430 at a time.

A packet classification engine 410 allows for classifying each of a plurality of received packets into a corresponding packet type of a plurality of packet types and for providing each of the plurality of received packets to a corresponding queue of the plurality of queues $420_1$, $420_2$, ..., $420_M$, based on the corresponding packet type of the packet. In various embodiments, the controller 440 is configured to access the plurality of queues $420_1$, $420_2$, ..., $420_M$, in a preset order. In some embodiments, the controller 440 is configured to determine an order in which to access the plurality of queues $420_1$, $420_2$, ..., $420_M$, based on information concerning a time required for processing packets of each packet type at each stage in the processing pipeline. One possible heuristic is to match packet types that are processed relatively fast in early stages of the processing pipeline 430 and relatively slow in later stages of the processing pipeline 430 with packet types that are processed relatively slow in early stages of the processing pipeline 430 and relatively fast in later stages of the processing pipeline 430, and then alternate sending packets of those packet types into the processing pipeline 430 when they are to be processed.

Thus, in various embodiments, the network processor 300 of FIG. 3, the network processor 300 of FIG. 4, and the network processor 400 of FIG. 5 allow for storing packets in queues according to packet type, and then accessing the queues in a desired order to provide the packets from the queues to a processing pipeline. By intelligently determining an order in which the queues are accessed to provide packets to the processing pipeline based on estimated processing times for packets of various packet types at each stage in the processing pipeline, such network processors may allow for improved packet processing performance.

Figure 6:
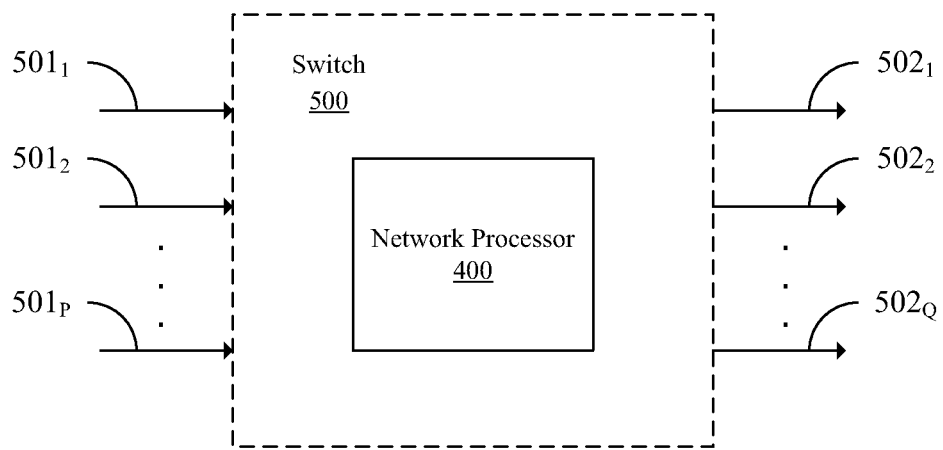
FIG. 6 illustrates a switch in accordance with an embodiment of the present invention.

FIG. 6 illustrates a switch 500 in accordance with an embodiment of the present invention. The switch 500 includes the network processor 400. The switch 500 receives packets from one or more network connections $501_1$, $501_2$, ..., $501_P$, such as Ethernet links, and provides packets that have been processed by the network processor 400 on one or more network connections $502_1$, $502_2$, ..., $502_Q$. In various embodiments, the switch 500 includes the network processor 300 of FIG. 3 or FIG. 4 rather than the network processor 400.

Figure 7:
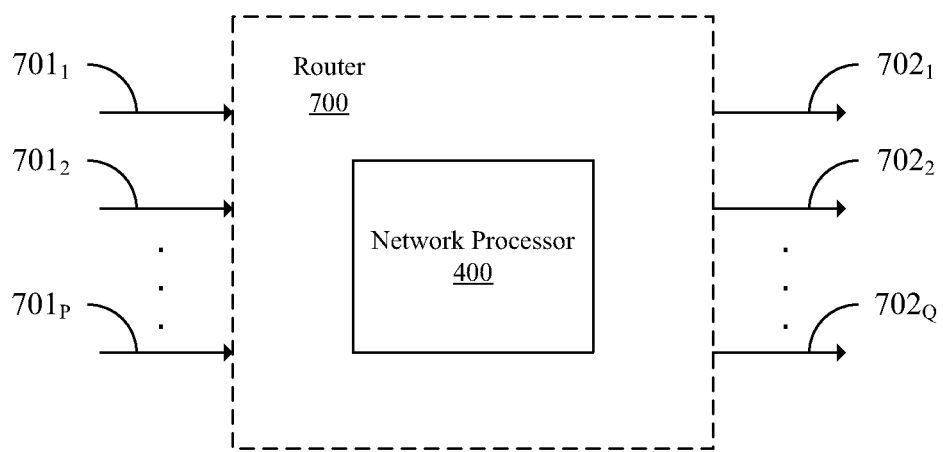
FIG. 7 illustrates a router in accordance with an embodiment of the present invention.
Figure 8:
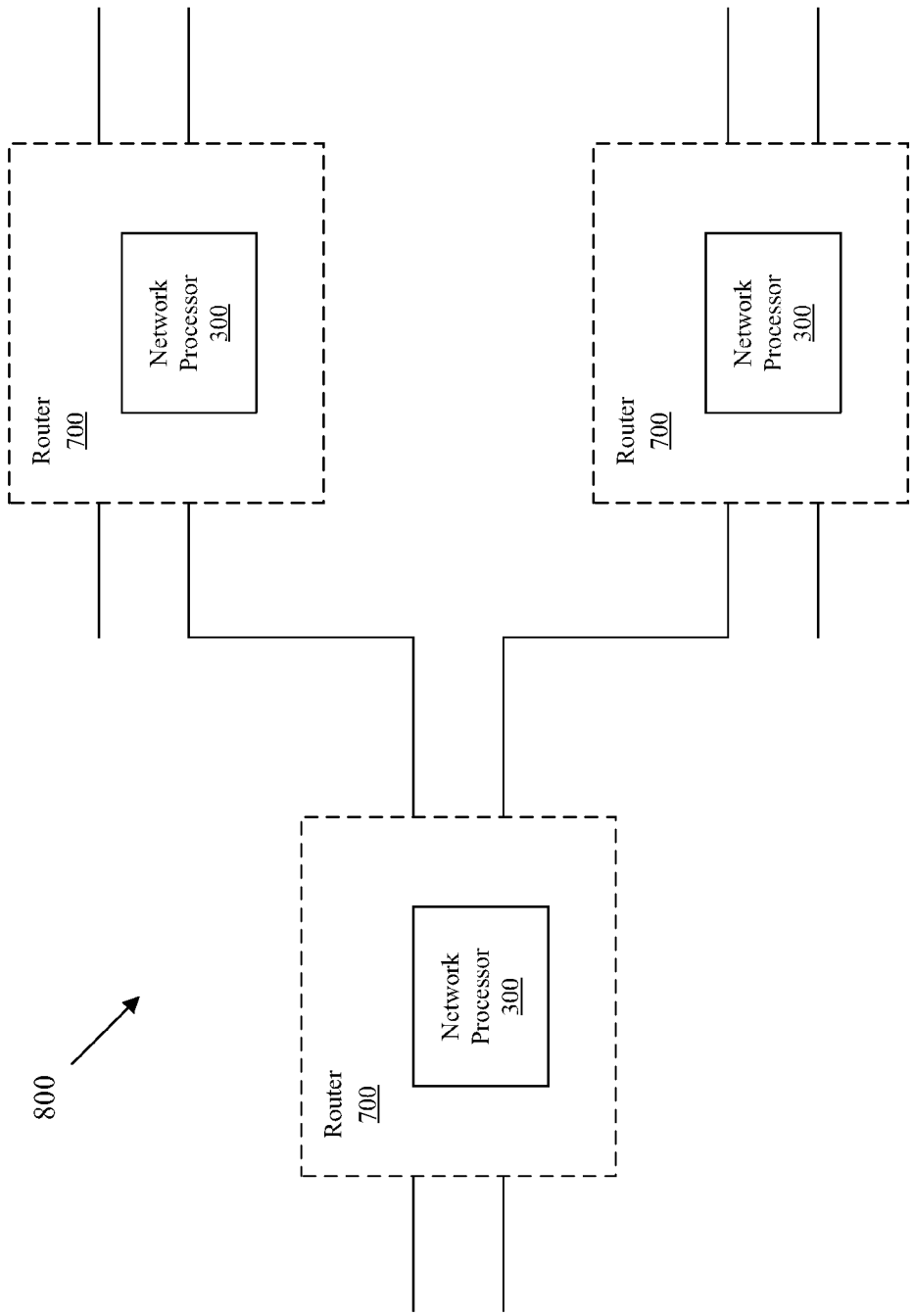
FIG. 8 illustrates a network in accordance with an embodiment of the present invention.

FIG. 7 illustrates a router 700 in accordance with an embodiment of the present invention. The router 700 includes the network processor 400. The router 700 receives packets from one or more network connections $701_1$, $701_2$, ..., $701_P$, such as Ethernet links, and provides packets that have been processed by the network processor 400 on one or more network connections $702_1$, $702_2$, ..., $702_Q$. In various embodiments, the router 700 includes the network processor 300 of FIG. 3 or FIG. 4 rather than the network processor 400. FIG. 8 illustrates a network 800 in accordance with an embodiment of the present invention including a plurality of routers 700 each including a corresponding network processor 300, where each router 700 allows for routing packets through the network 800.

Figure 9:
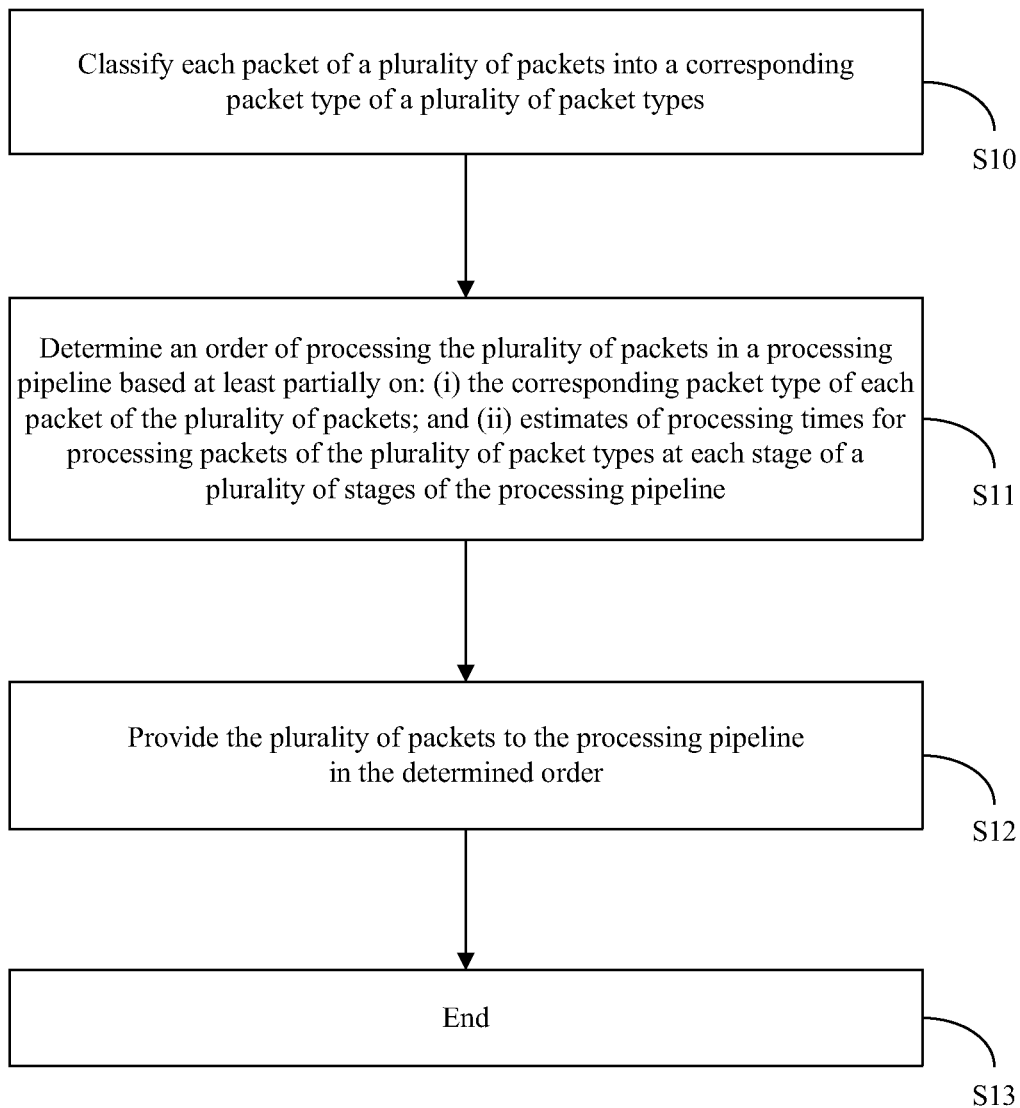
FIG. 9 illustrates a flowchart of a method in a network processor in accordance with an embodiment of the present invention.

FIG. 9 illustrates a flowchart of a method in a network processor in accordance with an embodiment of the present invention. In S10, each packet of a plurality of packets is classified into a corresponding packet type of a plurality of packet types, and the method continues to S11. In S11, an order of processing the plurality of packets in a processing pipeline is determined based at least partially on (i) the corresponding packet type of each packet of the plurality of packets and (ii) estimates of processing times for processing packets of the plurality of packet types at each stage of a plurality of stages of the processing pipeline, and then the method continues to S12. In S12, the plurality of packets are provided to the processing pipeline in the determined order, and the method ends in S13.

In various embodiments, the classifying includes classifying each packet of the plurality of packets into the corresponding packet type of the plurality of packet types based on at least one of header data of the packet and payload data of the packet. In some embodiments, prior to determining the order, the method further includes obtaining the estimates of processing times for processing packets of the plurality of packet types at each stage of the plurality of stages through experiments in which packets of the plurality of packet types are processed by the processing pipeline.

Figure 10:
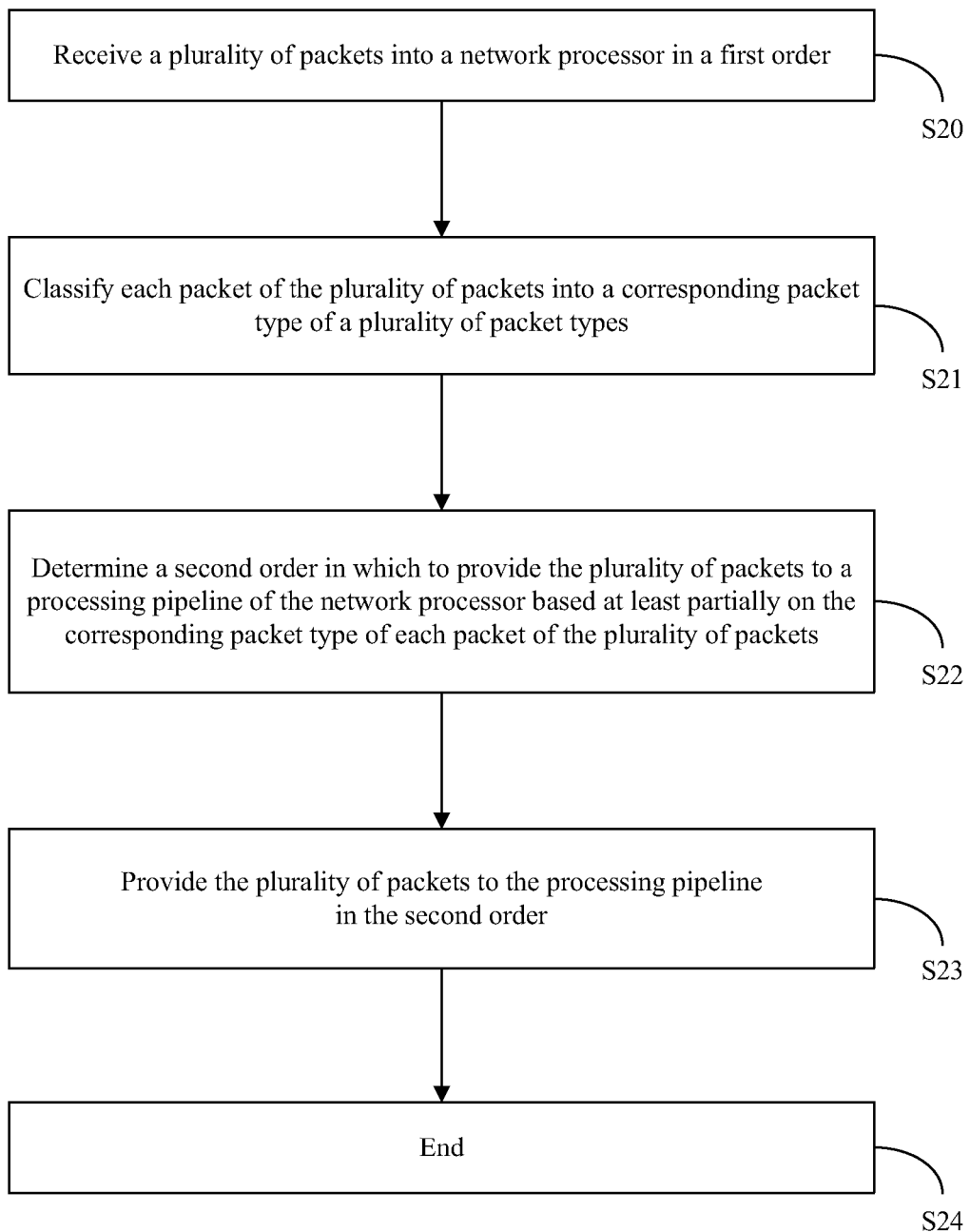
FIG. 10 illustrates a flowchart of a method in a network processor in accordance with an embodiment of the present invention.

FIG. 10 illustrates a flowchart of a method in a network processor in accordance with an embodiment of the present invention, where the network processor includes a processing pipeline having a plurality of stages. In S20, a plurality of packets are received into the network processor in a first order, and the method continues to S21. In S21, each packet of the plurality of packets is classified into a corresponding packet type of a plurality of packet types, and the method continues to S22. In S22, a second order in which to provide the plurality of packets to the processing pipeline is determined based at least partially on the corresponding packet type of each packet of the plurality of packets, and then the method continues to S23. In S23, the plurality of packets are provided to the processing pipeline in the second order, and the method ends in S24.

In various embodiments, the determining includes determining the second order in which to provide the plurality of packets to the processing pipeline based at least partially on (i) the corresponding packet type of each packet of the plurality of packets and (ii) estimates of processing times for processing packets of the plurality of packet types at each stage of the plurality of stages of the processing pipeline. In some embodiments, the receiving includes receiving the plurality of packets from one or more Ethernet links.

Figure 11:
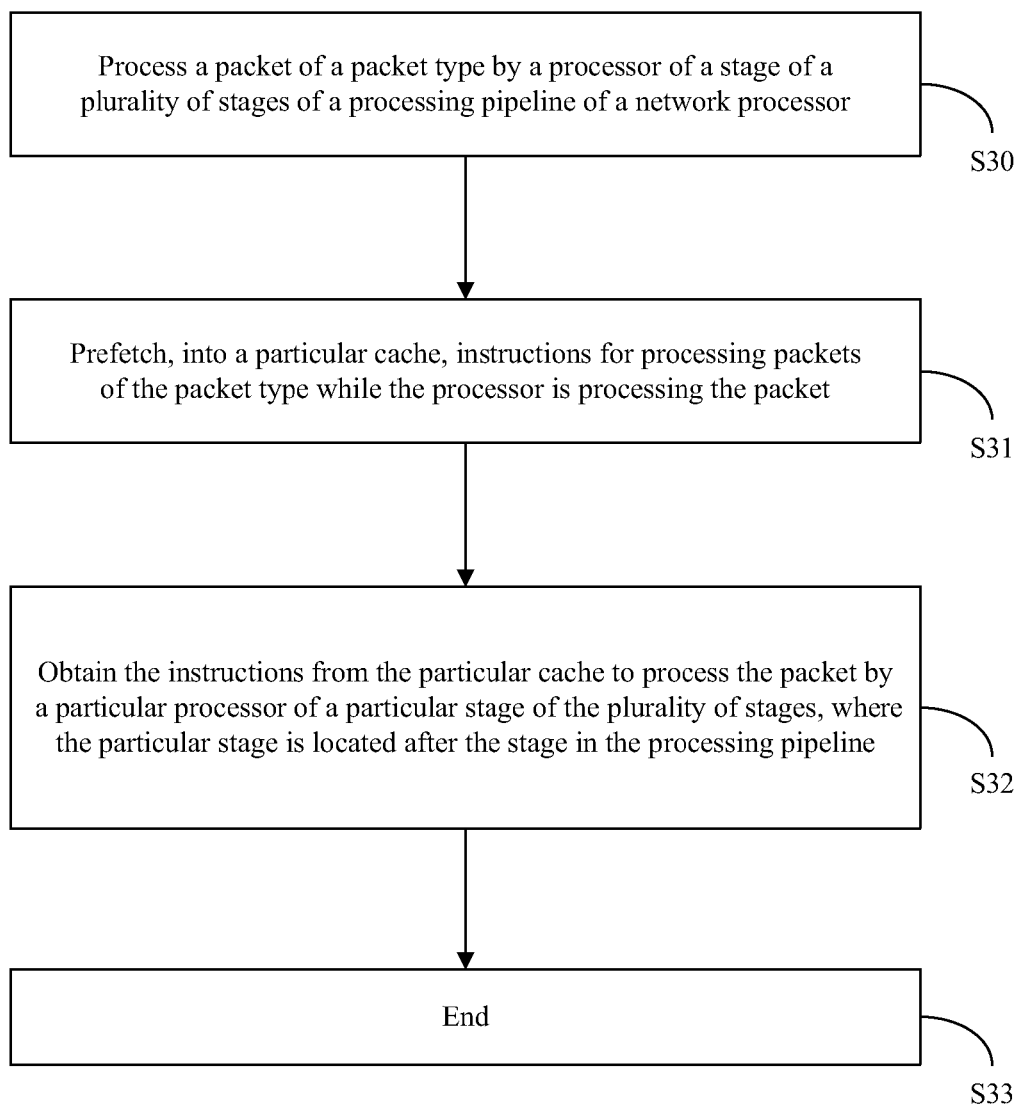
FIG. 11 illustrates a flowchart of a method in a network processor in accordance with an embodiment of the present invention.

FIG. 11 illustrates a flowchart of a method in a network processor in accordance with an embodiment of the present invention, where the network processor includes a processing pipeline having a plurality of stages. In S30, a packet of a packet type is processed by a processor of a stage of the plurality of stages, and the method continues to S31. In S31, instructions for processing packets of the packet type are prefetched into a particular cache while the processor is processing the packet, and the method continues to S32. It should be noted that S30 and S31 overlap at least partially in time. In S32, the instructions are obtained from the particular cache to process the packet by a particular processor of a particular stage of the plurality of stages, where the particular stage is located after the stage in the processing pipeline. The method then ends in S33.

In various embodiments, the processing includes performing table look-ups required for at least one of switching, routing, session switching, content switching, and policy enforcement related to the packet. Also, in various embodiments, the processing includes assigning the packet to an output port of a plurality of output ports. In some embodiments, the prefetching occurs while the particular processor is idle. Also, in some embodiments, the method of FIG. 11 is performed along with the method of FIG. 9. In various embodiments, the method of FIG. 11 is performed along with the method of FIG. 10.

A method in accordance with an embodiment of the present invention for designing a network processor will now be discussed. A method for optimizing a throughput of a pipeline using integer linear programming in accordance with embodiments of the present invention may be used in the design of network processors as well as for other applications. For example, such methods may also be used in the design of physical assembly lines. Each stage in the pipeline allows for processing inputs of different types. Each input type is associated with a value related to a probability that an input to the pipeline has the input type.

For each stage in the pipeline, a corresponding one or more implementation choices or processor design options are provided. For each design option of each stage, a corresponding potential throughput is specified for each input type. Also, for each design option of each stage, a corresponding cost is provided. A total budget is specified, and a sum of costs of selected design options is not allowed to exceed the total budget. Linear programming is used to select, for each stage, a respective design option that will optimize total throughput while ensuring that a sum of costs of the selected design options is within the total budget.

The costs of the design options may be specified, for example, as monetary costs, size costs, power costs, or the like. The total budget may specify, for example, a total monetary budget, a total size budget, a total power consumption budget, or the like. In various embodiments, it is assumed that, for each input type, a corresponding predetermined number of inputs of the input type are processed by the pipeline in an order before processing inputs of a different input type, where the corresponding predetermined number for each input type is greater than the number of stages in the pipeline and may be different for each input type. The following motivational example is provided to aid in understanding embodiments of the present method.

TABLE 1

Motivational Example

| | Stage 1 | | | | Stage 2 | | |
|---|---|---|---|---|---|---|---|
| | Option | Cost | Input % | Throughput | Option | Cost | Input % | Throughput |
| | 1 | 20 | | | 1 | 50 | | |
| Input 1 | | | 40 | 30 | | | 40 | 80 |
| Input 2 | | | 60 | 90 | | | 60 | 30 |
| | 2 | 30 | | | 2 | 70 | | |
| Input 1 | | | 40 | 70 | | | 40 | 100 |
| Input 2 | | | 60 | 40 | | | 60 | 40 |

Table 1 provides a motivational example for various embodiments of the present method. The motivational example is for a two stage pipeline (stage 1 and stage 2), where there are a corresponding two processor design options (option 1 and option 2) for each stage, and where there are two input types (input 1 and input 2) for inputs to the pipeline. Such an example may represent a two stage processing pipeline of a network processor in which there are two respective design options for processors to be used for each stage, and in which input packets may be classified into one of two packet types.

For the present example, it is assumed that a certain predetermined number of inputs of type input 1 will be input to the pipeline and then a particular predetermined number of inputs of type input 2 will be input to the pipeline, and then the processing of the inputs will repeat with another certain predetermined number of inputs of type input 1, and so on. It is also assumed for the present example that the certain predetermined number and the particular predetermined number are greater than the number of stages of the pipeline. In the motivational example, inputs of type input 1 represent 40% of the inputs to the pipeline, and inputs of type input 2 represent 60% of the inputs to the pipeline. Also, table 1 provides, for each design option, a corresponding cost, and also provides, for each design option and each input type, a corresponding potential throughput.

Assume, for the motivational example, that a total budget for the pipeline is 95. The problem is to determine which respective processor design option should be chosen for each stage to optimize total throughput, while ensuring that a sum of costs of the selected design options is not greater than the total budget. An initial thought may be to calculate an average throughput for each design option of each stage, and then to select, for each stage, a corresponding particular design option that has the highest average throughput for the stage, while still keeping the total sum of the costs within the total budget.

TABLE 2

Average Throughputs

| Stage | Option | Cost | Avg. Throughput |
|---|---|---|---|
| 1 | 1 | 20 | (.4)(30) + (.6)(90) = 66 |
| 1 | 2 | 30 | (.4)(70) + (.6)(40) = 52 |
| 2 | 1 | 50 | (.4)(80) + (.6)(30) = 50 |
| 2 | 2 | 70 | (.4)(100) + (.6)(40) = 64 |

Table 2 provides an average throughput for each design option of each stage. Based on the average throughputs provided in table 2, if design options were selected by highest average throughput per stage, the selected design options would be option 1 of stage 1 and option 2 of stage 2. The total cost for such a selection would be 90 (=20+70), which would be within the budget of 95. While selecting design options based on highest average throughput per stage may provide for a quick and reasonable solution to the problem, it might not provide for the optimal solution, because it does not take into account an effect of bottlenecks in the pipeline. For each input type, a stage with a corresponding minimum throughput for the input type acts as a bottleneck, such that a total throughput of the pipeline for the input type is limited to the corresponding minimum throughput.

TABLE 3

Average Total Throughputs

| Stage 1 Selected Design Option | Stage 2 Selected Design Option | Input 1 Throughput | Input 2 Throughput | Total Cost | Average Total Throughput |
|---|---|---|---|---|---|
| 1 | 1 | 30 | 30 | 70 | 30 |
| 1 | 2 | 30 | 40 | 90 | 36 |
| 2 | 1 | 70 | 30 | 80 | 46 |
| 2 | 2 | 70 | 40 | 100 | 52 |

Table 3 provides, for each possible combination of selected design options, a respective total cost and a respective average total throughput, while taking into account the effect of bottlenecks. As seen from the table, the optimal solution is to select option 2 for stage 1 and option 1 for stage 2, which provides for the highest average total throughput while keeping the total cost within the budget. As can be appreciated from the motivational example, a need exists for a method that allows for selecting design options for stages of a pipeline while taking into account the effect of bottlenecks, so as to optimize a throughput of the pipeline and keep a total cost of the pipeline within a given budget. An integer linear programming solution for the motivational example will now be discussed.

TABLE 4

Parameters for the Motivational Example

| | Stage 1 | | | | Stage 2 | | |
|---|---|---|---|---|---|---|---|
| | Option | Cost | Input % | Throughput | Option | Cost | Input % | Throughput |
| | 1 | | | | 1 | | | |
| | | $s_{11}$ | | | | $s_{21}$ | | |
| Input 1 | | | $p_1$ | $a_{111}$ | | | $p_1$ | $a_{211}$ |
| Input 2 | | | $p_2$ | $a_{112}$ | | | $p_2$ | $a_{212}$ |
| | 2 | | | | 2 | | | |
| | | $s_{12}$ | | | | $s_{22}$ | | |
| Input 1 | | | $p_1$ | $a_{121}$ | | | $p_1$ | $a_{221}$ |
| Input 2 | | | $p_2$ | $a_{122}$ | | | $p_2$ | $a_{222}$ |

Table 4 illustrates parameters that are used for an integer linear programming solution to the motivational example. As indicated in table 4, a cost for a design option j of a stage i is specified by $s_{ij}$, and a value related to a percentage of inputs of input type k is specified by $p_k$. Also, a potential throughput provided by a design option j of a stage i for an input type k is specified by $a_{ijk}$. A total budget for the pipeline is specified by $s_m$. Each of the parameters $s_{ij}$, $p_k$, $a_{ijk}$, and $s_m$ may be assumed to be an integer value.

For each design option j of each stage i, a binary variable $x_{ij}$ is provided, where a value of 1 for the binary variable $x_{ij}$ indicates that the design option j for the stage i is a selected design option for the pipeline, and a value of 0 for the binary variable $x_{ij}$ indicates that the design option j for the stage i is not a selected design option. Also, for each input type k, an integer variable $v_k$ is provided. An integer variable z is provided for the objective function of the integer programming equations.

The integer programming equations provided below allow for selecting, for each stage, a respective design option so as to optimize a total average throughput of the pipeline and keep a total cost of the pipeline within the total budget.

The integer linear programming equations for the motivational example are as follows:

Objective:
  Maximize (z)
Subject To:

$$x_{11} = \text{binary} \tag{1}$$

$$x_{12} = \text{binary} \tag{2}$$

$$x_{21} = \text{binary} \tag{3}$$

$$x_{22} = \text{binary} \tag{4}$$

$$v_1 \geq 0 \tag{5}$$

$$v_2 \geq 0 \tag{6}$$

$$x_{11} + x_{12} = 1 \tag{7}$$

$$x_{21} + x_{22} = 1 \tag{8}$$

$$v_1 \leq a_{111} x_{11} + a_{121} x_{12} \tag{9}$$

$$v_1 \leq a_{211} x_{21} + a_{221} x_{22} \tag{10}$$

$$v_2 \leq a_{112} x_{11} + a_{122} x_{12} \tag{11}$$

$$v_2 \leq a_{212} x_{21} + a_{222} x_{22} \tag{12}$$

$$s_{11} x_{11} + s_{12} x_{12} + s_{21} x_{21} + s_{22} x_{22} \leq s_m \tag{13}$$

$$z = p_1 v_1 + p_2 v_2 \tag{14}$$

In the above integer linear programming equations, constraints (1)-(4) specify that the decision variables that indicate whether or not a design option is to be selected are binary variables. Constraints (5) and (6) specify that a throughput for an input type must be non-negative. Constraints (7) and (8) specify that, for each stage, only one of the possible design options for the stage can be chosen for the pipeline. Constraints (9)-(12) are herein named the "bottleneck equations". The bottleneck equations ensure that, for each input type, a total throughput for the input type is not greater than a minimum throughput for the input type among all selected design options for the pipeline.

The bottleneck equations for the motivational example can be re-written as follows:

$$a_{111} x_{11} + a_{121} x_{12} - v_1 \geq 0 \tag{9}$$

$$a_{211} x_{21} + a_{221} x_{22} - v_1 \geq 0 \tag{10}$$

$$a_{112} x_{11} + a_{122} x_{12} - v_2 \geq 0 \tag{11}$$

$$a_{212} x_{21} + a_{222} x_{22} - v_2 \geq 0 \tag{12}$$

With reference again to the above integer programming equations for the motivational example, constraint (13) specifies that a total cost of selected design options must not exceed the total budget. Constraint (14) scales the throughputs for each input type according to integer values related to the percentage of inputs that are of the input type, and sets the variable z equal to the sum of the scaled throughputs. The objective function specifies that z is to be maximized, where the variable z is related to the total average throughput of the pipeline. Once the integer programming solution is determined, the values of the variables $x_{ij}$ specify, for each stage, which respective processor design option should be selected for the pipeline.

A generalized integer linear programming solution in accordance with an embodiment of a method of the present invention will now be discussed.

The integer linear programming equations can be generalized. For the generalized equations, the set of stages is denoted I, the set of input types is denoted K, and the set of design options for each stage i∈I is denoted $J_i$. The size of set I is E, which means there are E stages. The size of set K is H, which means there are H possible input types. For each stage i∈I, the size of set $J_i$ is $G_i$, which means there are $G_i$ possible design options for stage i. For each design option j∈$J_i$ of each stage i∈I, a binary variable $x_{ij}$ is provided, and for each input type k∈K, an integer variable $v_k$ is provided. For each design option j∈$J_i$ of each stage i∈I and for each input type k∈K, a respective integer value $a_{ijk}$ specifies a potential throughput provided by the design option j of the stage i for the input type k. For each design option j∈$J_i$ of each stage i∈I, a respective integer value $s_{ij}$ specifies a cost for the design option j of the stage i. A total budget is specified by an integer value $s_m$. For each input type k∈K an integer value $p_k$ is provided that is related to a percentage of inputs that are of input type k. An integer variable z is provided for the objective function.

The generalized integer linear programming equations are as follows:

Objective:

Maximize (z)

Subject To:

$$x_{ij} = \text{binary}, \forall\, i \in I, j \in J_i \tag{1}$$

$$v_k \geq 0, \forall\, k \in K \tag{2}$$

$$\sum_{j=1}^{G_i} x_{ij} = 1, \forall\, i \in I \tag{3}$$

$$\left[\sum_{j=q}^{G_i} (a_{ijk} x_{ij})\right] - v_k \geq 0, \forall\, i \in I, k \in K \tag{4}$$

$$\sum_{i=1}^{E} \sum_{j=1}^{G_i} (s_{ij} x_{ij}) \leq s_m \tag{5}$$

$$z = \sum_{k=1}^{H} p_k v_k \tag{6}$$

The above equations are generalized integer linear programming equations for embodiments of the present invention. Once the integer programming solution is determined, the values of the variables $x_{ij}$ specify, for each stage i∈I, which respective design option j∈$J_i$ should be selected for the pipeline. A value of 1 for $x_{ij}$ specifies that option j has been selected for stage i.

An alternate embodiment for the generalized integer linear programming equations will now be discussed. In the alternate embodiment, for each design option j∈$J_i$ of each stage i∈I and for each input type k∈K, the respective integer value $a_{ijk}$ specifies an estimated processing time provided by the design option j of the stage i for the input type k, rather than a throughput. A set labeled "B" is defined, where the set B provides a listing of an order of packet types in which packets of the packet types are to be provided to a processing pipeline. For example, if packets are to be provided to a pipeline according to a repeating order of a packet of type 2, a packet of type 3, a packet of type 2, and a packet of type 1, then the set B would be defined as B={2, 3, 2, 1}. Then, a set labeled "R" is obtained as the reverse of B. In the example, R would be defined as R={1, 2, 3, 2}, which is the reverse order of B. The set R is defined as R={$R_1, R_2, R_3, \ldots, R_T$}, where T is the number of packet types in the repeating order of packet types provided to the processing pipeline.

The generalized integer linear programming equations may then be as follows:

Objective:

Minimize (z)

Subject To:

$$x_{ij} = \text{binary}, \forall\, i \in I, j \in J_i \tag{1}$$

$$\sum_{j=1}^{G_i} x_{ij} = 1, \forall\, i \in I \tag{2}$$

$$v_k \geq \sum_{j=1}^{G_i} \left(a_{ujR_{(((i+k-2)\bmod H)+1)}} x_{ij}\right), \forall\, i \in I, k \in K \tag{3}$$

$$\sum_{i=1}^{E} \sum_{j=1}^{G_i} (s_{ij} x_{ij}) \leq s_m \tag{4}$$

$$z = \sum_{k=1}^{H} v_k \tag{5}$$

The above equations are generalized integer linear programming equations for embodiments of the present invention. Once the integer programming solution is determined, the values of the variables $x_{ij}$ specify, for each stage i∈I, which respective design option j∈$J_i$ should be selected for the pipeline. A value of 1 for $x_{ij}$ specifies that option j has been selected for stage i.

Figure 12:
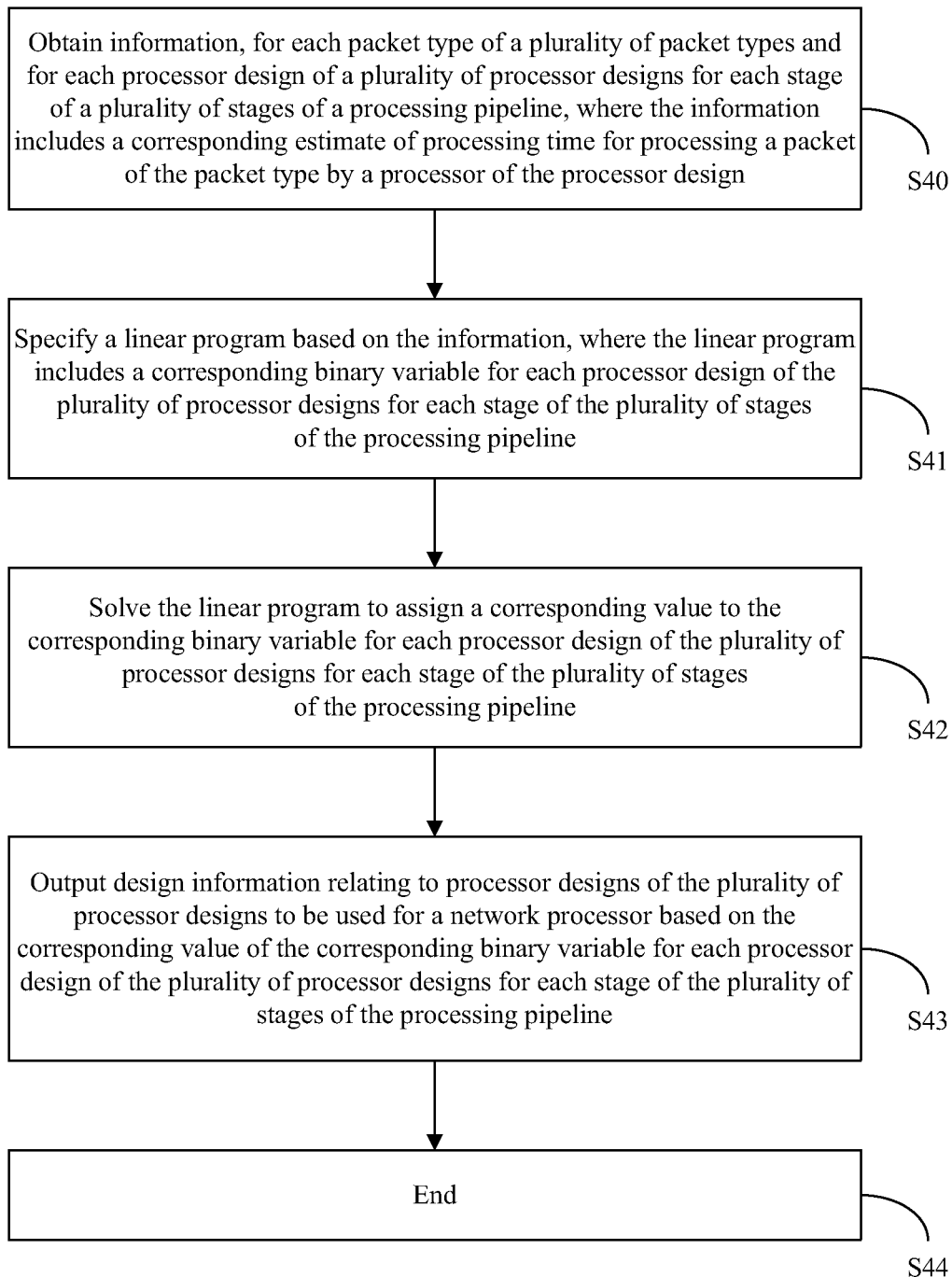
FIG. 12 illustrates a flowchart of a method in accordance with an embodiment of the present invention.

FIG. 12 illustrates a flowchart of a method in one or more computers in accordance with an embodiment of the present invention. The one or more computers may include a display, such as a liquid crystal display or the like, for outputting information, and may include a printer, such as a laser printer or the like, for printing out information. In S40, information is obtained for each packet type of a plurality of packet types and for each processor design of a plurality of processor designs for each stage of a plurality of stages of a processing pipeline, where the information includes a corresponding estimate of processing time for processing a packet of the packet type by a processor of the processor design. The method then continues to S41. In S41, a linear program is specified based on the information, where the linear program includes a corresponding binary variable for each processor design of the plurality of processor designs for each stage of the plurality of stages of the processing pipeline, and the method continues to S42. In S42, the linear program is solved to assign a corresponding value to the corresponding binary variable for each processor design of the plurality of processor designs for each stage of the plurality of stages of the processing pipeline, and the method continues to S43. In S43, design information is output relating to processor designs of the plurality of processor designs to be used for a network processor based on the corresponding value of the corresponding binary variable for each processor design of the plurality of processor designs for each stage of the plurality of stages of the processing pipeline. The method then ends in S44. In various embodiments, the method further includes constructing a network processor in accordance with the design information.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A network processor, comprising:
a packet classification engine for classifying each of a plurality of packets according to packet type;
a processing pipeline having a plurality of stages for processing each of the plurality of packets in a pipelined manner, each stage of the plurality of stages including one or more processors; and
a controller for prefetching, from a memory to a cache while a packet is being processed by a processor of a stage of the plurality of stages, instructions based on a packet type of the packet that are to be used by another processor in a following stage of the plurality of stages to process the packet.

2. The network processor of claim 1, further comprising:
a plurality of queues, each queue of the plurality of queues for storing packets of a corresponding packet type, said plurality of queues configured to store said plurality of packets;
said controller configured to access said plurality of queues to provide the plurality of packets to the processing pipeline.

3. The network processor of claim 1,
wherein each packet of the plurality of packets includes a packet header and payload data.

4. The network processor of claim 3,
wherein the packet classification engine is configured to classify each packet of the plurality of packets into a corresponding packet type of a plurality of packet types based on at least one of the packet header and the payload data of the packet being classified.

5. The network processor of claim 1,
said network processor located in at least one of a router and a switch.

6. The network processor of claim 1,
said packet classification engine configured to receive the plurality of packets from an Ethernet connection.

7. A method performed by a network processor, the method comprising:
classifying each of a plurality of packets into a corresponding packet type of a plurality of packet types; and
prefetching, from a memory to a cache while a packet is being processed by a processor of a stage of a plurality of stages of a processing pipeline, instructions based on a packet type of the packet that are to be used by another processor in a following stage of the plurality of stages to process the packet.

8. The method of claim 7, further comprising:
processing the packet by said another processor using the instructions from the cache.

9. The method of claim 7, said classifying comprising:
classifying each packet of the plurality of packets into the corresponding packet type of the plurality of packet types based on at least one of header data and payload data of the packet being classified.

10. The method of claim 7, wherein the processing of the packet by said another processor comprises:
performing table look-ups required for at least one of switching, routing, session switching, content switching, and policy enforcement related to the packet.

11. The method of claim 7, wherein the processing of the packet by said another processor comprises:
assigning the packet to an output port of a plurality of output ports.

12. The method of claim 7,
said prefetching occurring while said another processor is idle.

13. A method performed by a network processor, said network processor including a processing pipeline having a plurality of stages, said method comprising:
processing a packet of a packet type by a processor of a stage of the plurality of stages;
prefetching, into a particular cache, instructions based on the packet type of the packet for processing packets of said packet type, said prefetching initiated by a controller distinct from said processor while said processor is processing said packet; and
obtaining said instructions from said particular cache to process said packet by a particular processor of a particular stage of the plurality of stages, said particular stage located after said stage in said processing pipeline.

14. The method of claim 13, said prefetching comprising:
prefetching said instructions into said particular cache from a memory that is external to said processor.

15. The method of claim 13,
said controller distinct from said particular processor.

* * * * *